United States Patent

[11] 3,603,268

| [72] | Inventors | Antoine Henri Wietzel;<br>Rene Robert Roche, both of 4, bd. Carnot, 06-, Nice, France |
|---|---|---|
| [21] | Appl. No. | 834,298 |
| [22] | Filed | June 18, 1969 |
| [45] | Patented | Sept. 7, 1971 |
| [32] | Priority | June 18, 1968 |
| [33] | | France |
| [31] | | 9219AM |

[54] PASTRY MAKING MACHINE FOR PRODUCING CRESCENT ROLLS
10 Claims, 14 Drawing Figs.

| [52] | U.S. Cl. | 107/4, 107/68 |
|---|---|---|
| [51] | Int. Cl. | A21c 5/00 |
| [50] | Field of Search | 107/1, 4, 54, 68, 69 |

[56] References Cited
UNITED STATES PATENTS

| 3,225,717 | 12/1965 | Page | 107/69 |
|---|---|---|---|
| 3,391,655 | 7/1968 | Schafer | 107/68 X |
| 3,439,632 | 4/1969 | Pirotsky | 107/4 X |
| 3,494,302 | 2/1970 | Wolf et al. | 107/1 |

*Primary Examiner*—Louis K. Rimrodt
*Attorney*—Young & Thompson

ABSTRACT: A pastry machine for making crescent rolls comprising a rolling mill for urging dough through cylinders into sheet formation, means conveying the sheet forwardly from the rolling mill or other supplying means, a V-shaped cutter pivoting around an axis parallel to the path of the dough so as to form adjacent triangular dough elements in the sheet which elements face alternately the opposite edges of the dough sheet, and finally frictional means engaging the base of each successive triangular element to wind the latter around its base into roll shape, after which the roll may be bent into crescent shape.

INVENTORS
ANTOINE HENRI WIETZEL
RENE ROBERT ROCHE
By Young + Thompson
ATTYS.

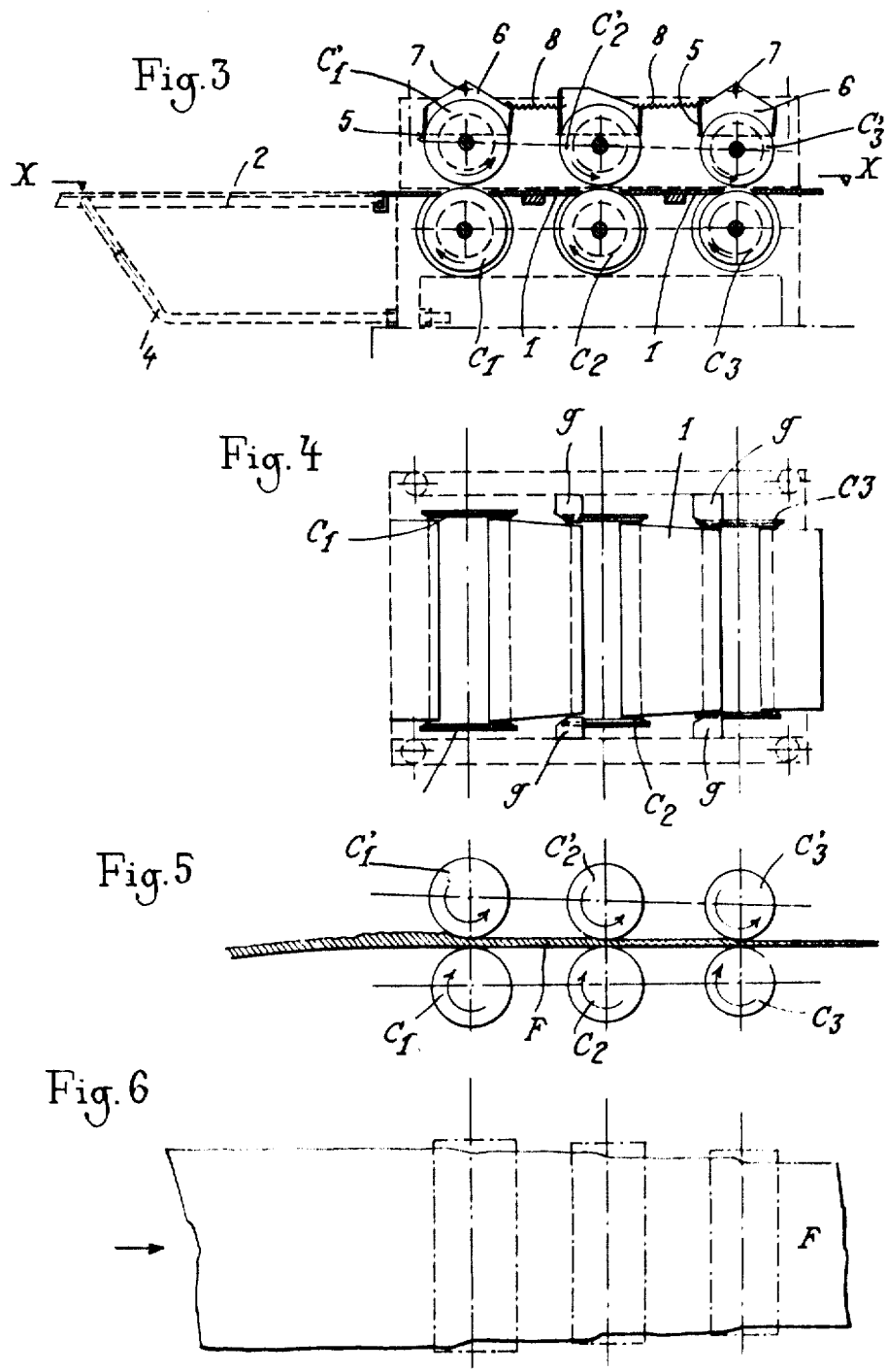

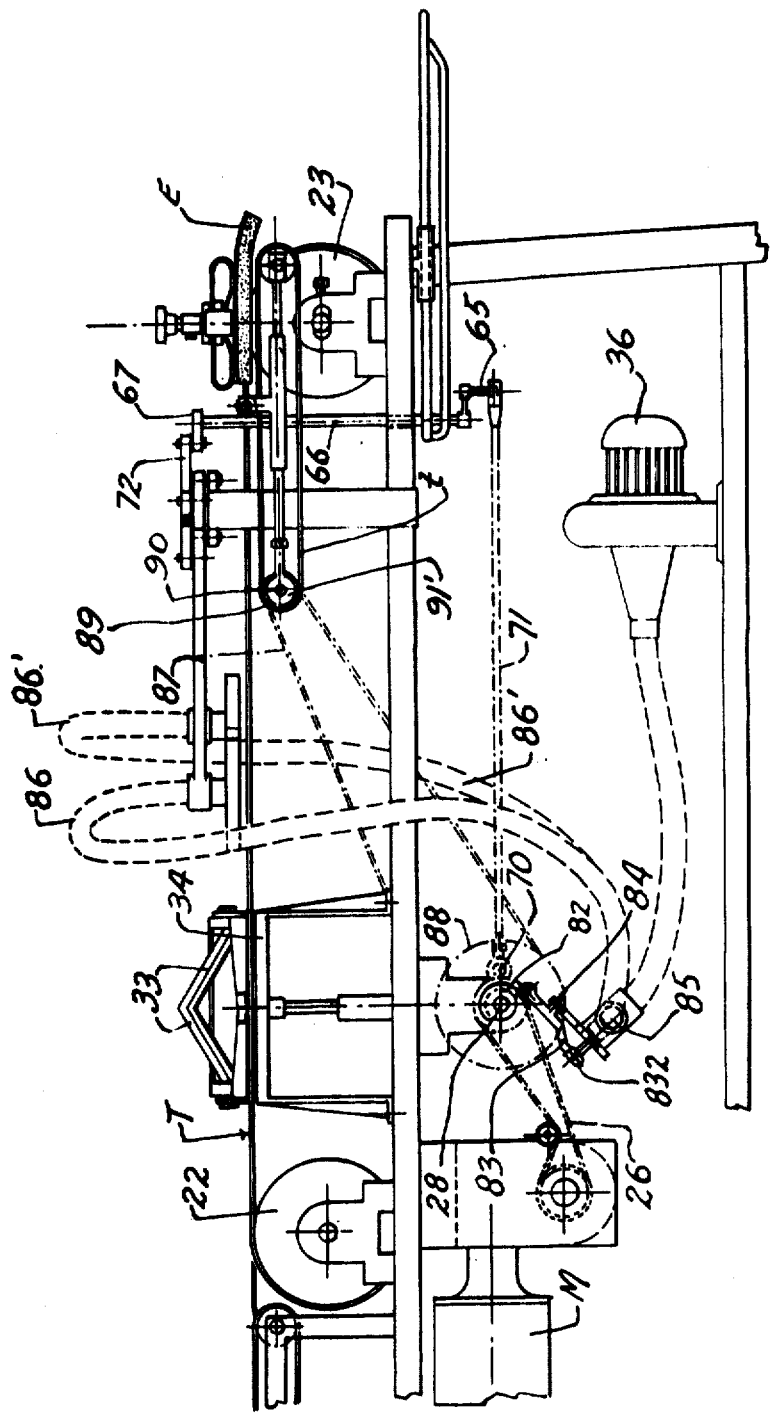

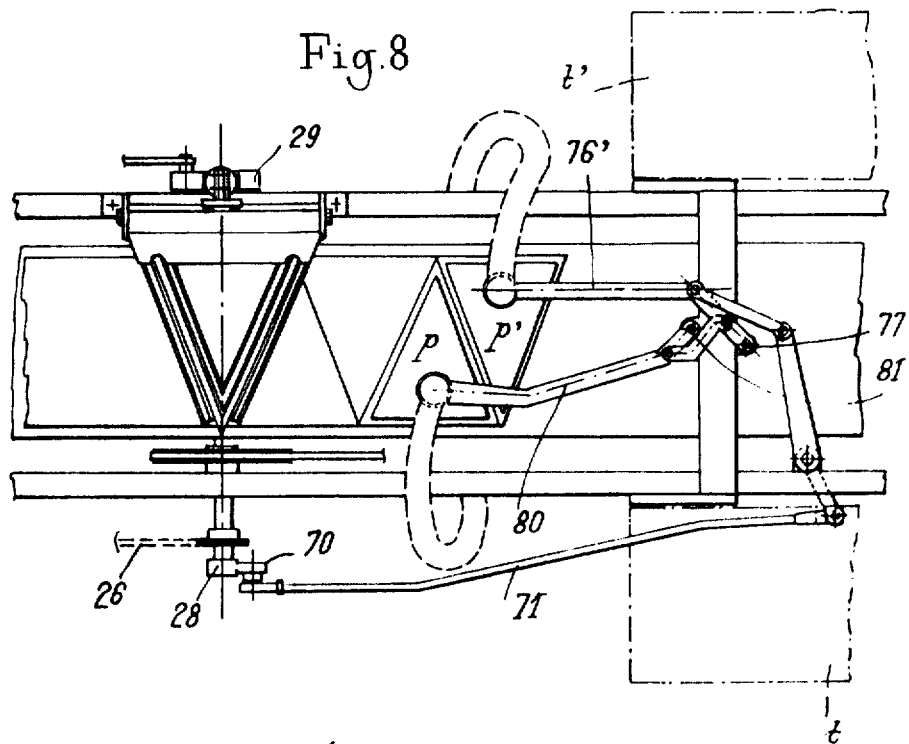
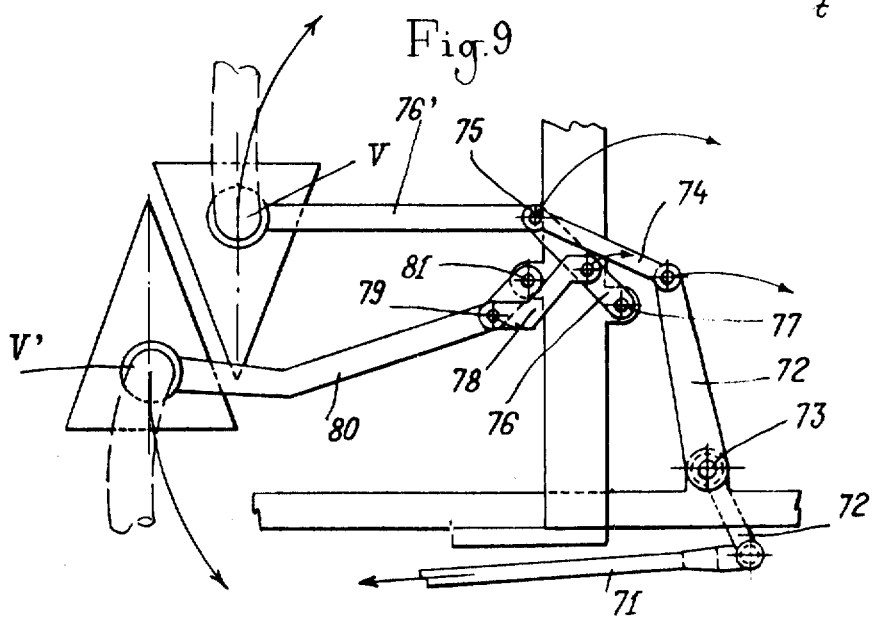

INVENTORS
ANTOINE HENRI WIETZEL
RENE ROBERT ROCHE
BY Young + Thompson
ATTYS.

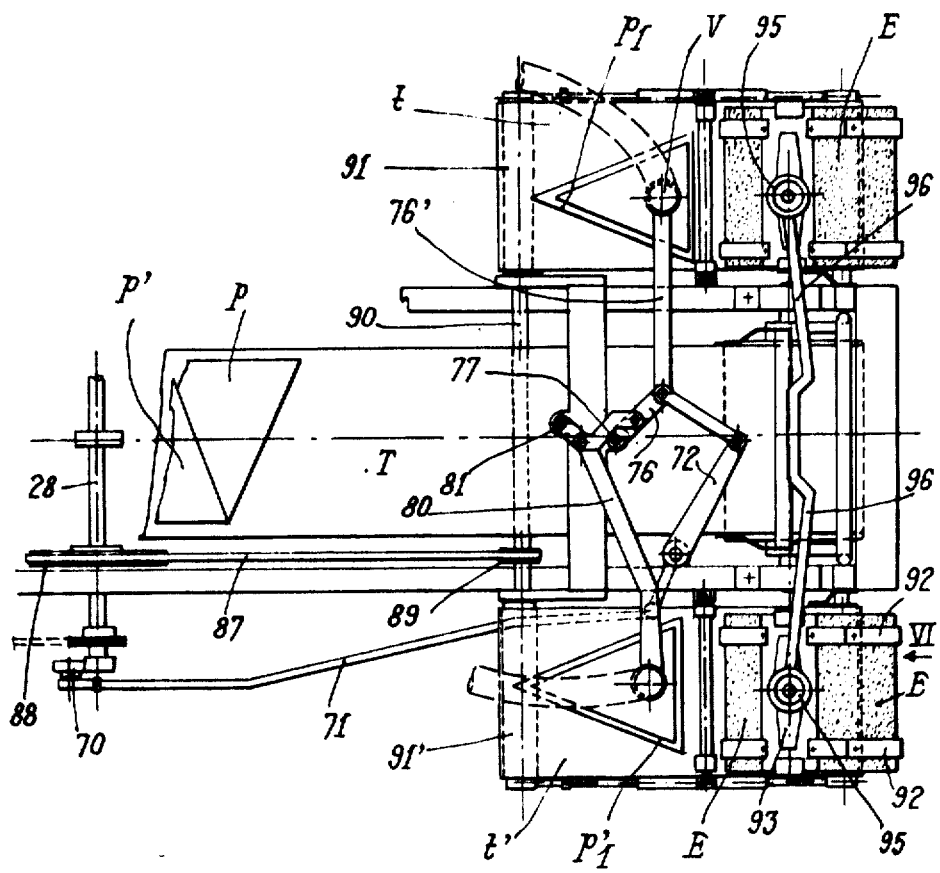

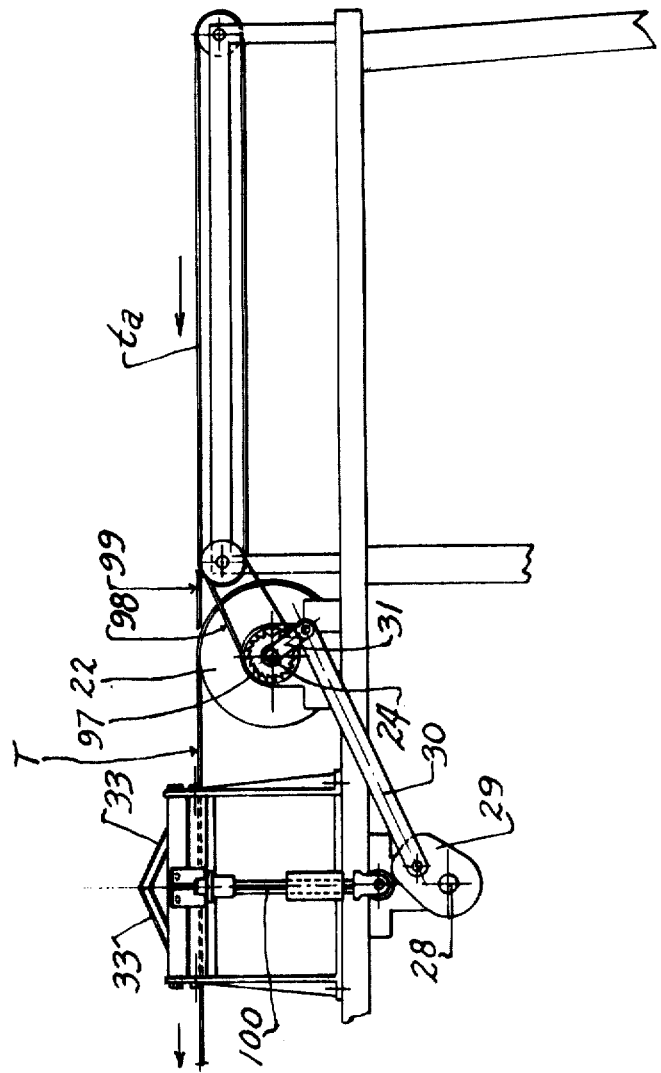

PASTRY MAKING MACHINE FOR PRODUCING CRESCENT ROLLS

Our invention has for its object a machine for producing crescent rolls including chiefly a conveyor belt feeding a sheet of dough of the desired thickness and breadth first underneath cutting means adapted to cut the dough into triangular elements and then into an arrangement transforming said elements into rolls which are thenafter delivered at the output end of the machine and incurved by hand so as to assume their final crescent shape. The sheet of dough may be formed in a rolling mill incorporated with the machine.

The cutting means are constituted by two cutters forming together a V-shaped system so as to cut the sheet into successive pairs of triangular elements the apices of which are arranged alternately along the opposite sides of the conveyor belt which progresses then intermittently and stepwise by the length of one pair of triangles facing opposite directions.

The means for winding the dough elements into rolls is constituted chiefly by a short runway over which each dough element is brought and which leads the latter into a location underneath a yielding rough-surfaced plate made of sponge rubber for instance whereby friction against said plate causes the dough element to be wound around an axis coinciding with the base of the triangle. In a preferred embodiment of said arrangement, there are two runways which extend in parallelism with and to either side of the main endless belt and cooperate with the dough elements of the successive pairs which face the runway considered; to this end, two movable suction cups take hold each of the corresponding triangular dough elements through the agency of a suitably arranged pivotally connected lever so as to transfer said elements onto the corresponding runway.

Such a machine may produce 3,000 to 3,500 crescent rolls per hour whereas by hand a good pastry cook can only produce about 400 or so crescent rolls.

The accompanying drawings illustrate by way of example a preferred embodiment of my invention constituted by a machine incorporating a rolling mill. In said drawings:

FIGS. 3 and 4 are detail views of the cylinders of the rolling mill.

FIGS. 5 and 6 illustrate the operation of said cylinders.

FIG. 7 is a lateral elevational view of the rear section of the machine providing for the cutting and winding of the crescent rolls.

FIG. 8 is a partial plan view corresponding to FIG. 7, the suction cups being illustrated in the position engaging the dough elements on the conveyor belt feeding them.

FIGS. 9 and 10 are plan views on a larger scale of the mechanism conveying the suction cups for two positions thereof.

FIG. 11 is a plan view of the roll winding mechanism.

FIG. 13 illustrates the case where the rolling mill is omitted, the sheet of dough being prepared elsewhere for the machine.

Figure 1:
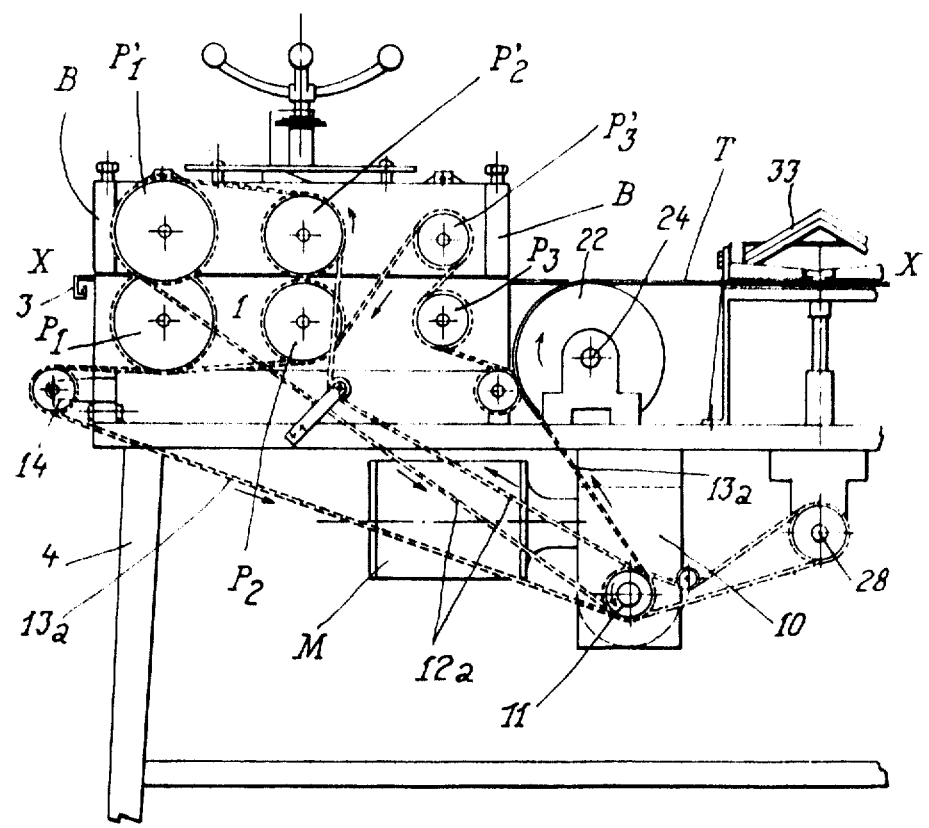
FIGS. 1 and 2 are elevational side views from the left and right hand sides of the front or rolling mill section of said machine.

Rolling of the dough (FIGS. 1 to 6):

As illustrated in FIG. 1, the horizontal plane X—X carrying the laminated dough sheet is constituted by transversely reinforced metal sheets having gaps between them for the rolling mill cylinders frictionally engaged by them and including a front extension constituted by a movable plate 2 (FIG. 3) secured to hooks 3 rigid with the frame 4 carried by depending feet and onto which the dough is brought. The lamination is executed by three pairs of cylinders C1,C'1-C2,C'2-C3,C'3 (FIG. 3). The upper generating lines of the lower cylinders C1, C2, C3 are located in the same plane XX whereas the lower generating lines of the upper cylinders C'1, C'2, C'3 are located at increasingly lower positions in order to gradually reduce the thickness of the dough. The upper cylinders are provided each with a pair of scrapers 5 engaging opposite sides thereof and which are interconnected by flanges 6; the flanges extending over the upper extreme cylinders are suspended from pivotal trunnions 7 and are furthermore connected with the flanges corresponding to the medial cylinder by springs 8 in a manner such that the scrapers may be entirely free in their movements engaging the cylinder surfaces. The breadth of the dough sheet and the gap between the cylinders decreases from one pair of cylinders to the next, the edges of the dough sheet being urged inwardly between the successive pairs of cylinders by oblique guiding members g secured to the metal sheets 1 (FIG. 4).

FIGS. 5 and 6 illustrate the gradual shaping of the dough sheet F as to thickness and breadth. The cylinders are controlled as follows:

The motor M (FIG. 1) controlling all the parts of the machine is associated with a speed reducer 10 to the output shaft 11 of which three toothed wheels are keyed of which two are operatively connected with the cylinders through the agency of chains, to wit: the chain 12a controlling the pinions P'1, P'2 coaxially rigid with the upper cylinders C'1, C'2, the chain 13a controlling the pinions P1 and P2 coaxially rigid with the lower cylinders C1 and C2 and also the pinions P3 and P'3 coaxially rigid with the cylinders C3 and C'3 forming the third pair, after passing over the guiding roller 14. It should be remarked that the diameter of the pinions decreases from one pair of the cylinders to the next in a manner such that the successive pairs of cylinders revolve at increasingly high speeds so as to stretch the dough as its thickness decreases.

Figure 2:
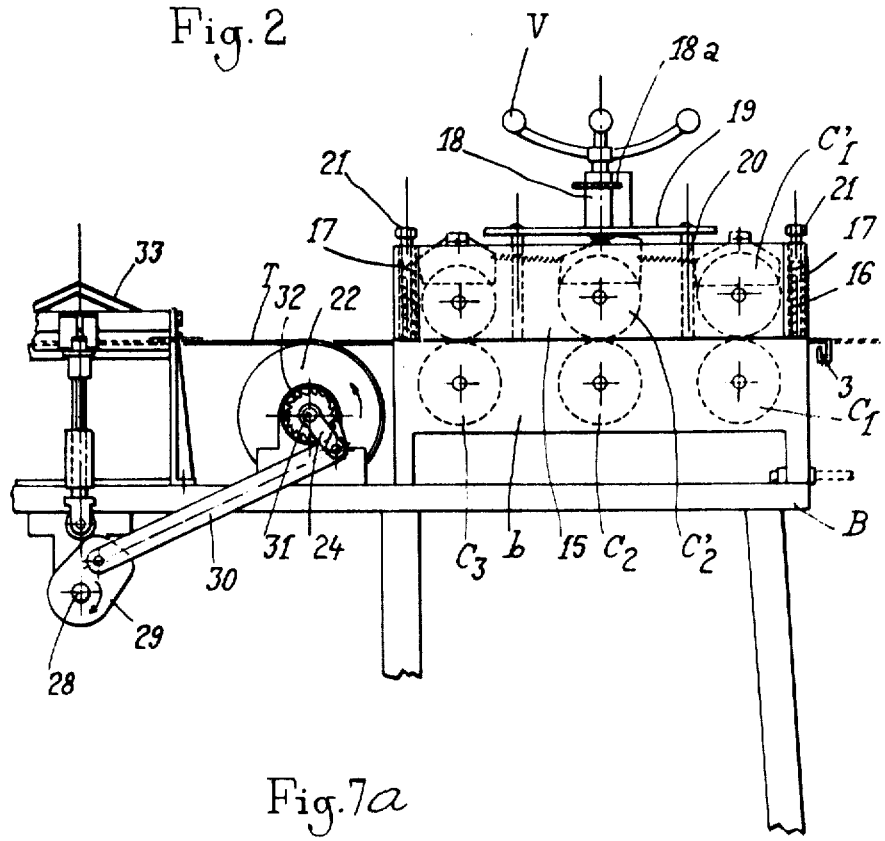

The bearings for the lower cylinders are carried by the lateral flanges of the frame and their height is therefore unvarying. The bearings for the upper cylinders are in contradistinction fitted in the flanges of an auxiliary frame B (FIGS. 1 and 2) adapted to move along the vertical guiding rods 20 welded to the sides of the main frame 4 (FIG. 2). Springs 17 housed within the slideway 16 urge said auxiliary frame upwardly at its front and rear ends. Two worms 18 are screwed into the lateral bars 19 secured to the upper ends of the guiding members 20 and are interconnected by a chain 18a passing over pinions so that said worms 18 may be controlled simultaneously by a common handwheel V fitted on one of said worms whereby said worms may engage through their lower ends 18b the upper edges of the flanges 15 at a point at midlength thereof, which engagement lowers the auxiliary frame against the action of the springs 17 while allowing said auxiliary frame to rock slightly around its bearing line defined by the ends 18b. After adjustment, by means of the handwheel, of the location of the medial cylinder C'2, said auxiliary frame is held fast in the desired sloping position by fastening the bolts 21 fitted at its ends over stops rigid with the frame B.

Cutting of the dough sheet (FIGS. 7 and 7a):

When the dough sheet reaches the end of the metal sheet 1, it engages an endless conveyor belt T made of braided wool and carried by two drums 22 and 23 (FIG. 7), the shaft 24 of the drum 22 (FIG. 1) being driven by the output shaft 11 controlling the rolling mill through the agency of a toothed wheel 25 keyed to said shaft 11 and connected with the shaft 24 as follows:

A chain 26 (FIG. 7) connects said toothed wheel 25 with a wheel keyed to the shaft 28 carrying on the opposite side of the machine as illustrated in FIG. 2 an eccentric cam 29 which latter controls through a connecting link 30 a crank 31 adapted to revolve freely around the shaft 24 and carrying a catch adapted to engage a ratchet wheel 32 keyed to the shaft 24 (FIG. 2). It will be readily ascertained that each revolution of the shaft 28 causes the catch to make the ratchet wheel progress by a few teeth whereby the conveyor belt T progresses in its turn by a predetermined length whereas during the return stroke of the catch the conveyor belt is stationary. During said period during which the belt is stationary the dough sheet is cut by the two cutters 33, 33 arranged in V-shaped formation as clearly shown in FIG. 8.

Figure 7A:
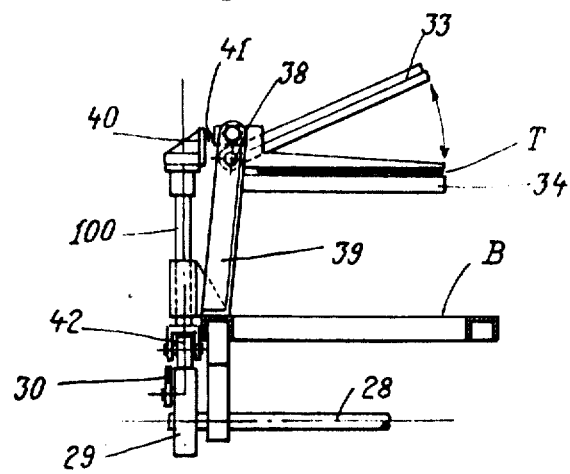
FIG. 7a is a cross-sectional view taken on the line 7a—7a of FIG. 7.
Figure 10:
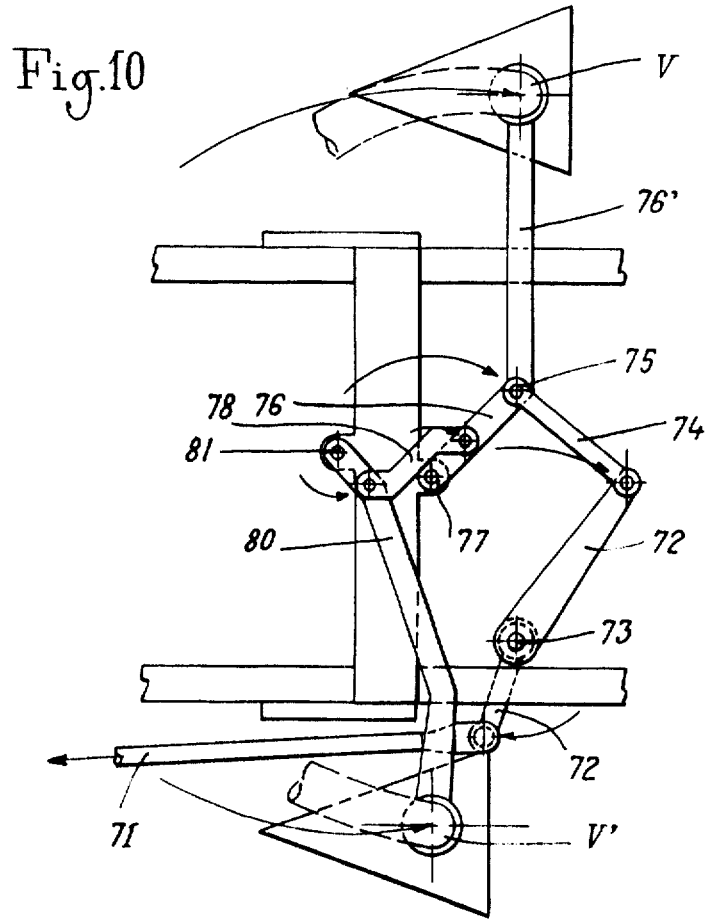
Figure 12:
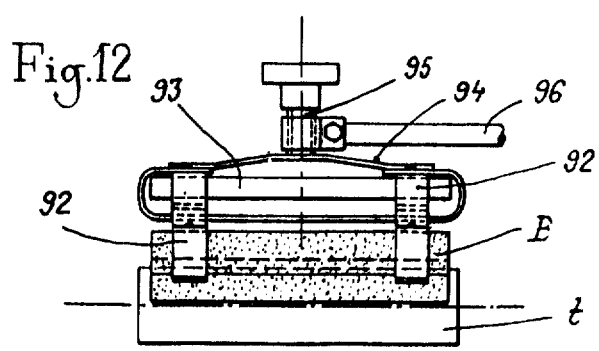
FIG. 12 is a partial elevational view corresponding to FIG. 11.

The upper side of the belt 7 slides over the upper surface of a hollow table 34 (FIG. 7) which is provided with a number of small holes communicating with suction means 36 and acting consequently after the manner of suction cups on the dough sheet through the belt. This has for its result since the rolling means operate continuously and the conveyor belt progresses intermittently the formation at each stop of the latter of a fold in the dough sheet while during the following progression of the belt the fraction of the sheet of dough located to the front of the cutting means is carried along by the belt the speeds being adjusted so that the fold is cut out during the last-mentioned stage. At the lower end or apex of the V formed by the cutters 33, 33 the latter are fitted as illustrated in FIG. 7a on a sleeve revolving freely around a stationary spindle 38 carried by a support 39 rigid with the auxiliary frame B. The medial section of said sleeve is rigid with a bent member 40 acting as a lever one end of which is subjected to the action of a spring 41 which urges thus the cutters upwardly while its other end carries a roller 42 adapted to cooperate with the edge of the cam 29. Angle bars extend just above the dough sheet and are located to either side of the corresponding cutters 33 so as to prevent the dough from following the cutters during their rising movement if the suction action provided through the table 34 is not sufficient for this purpose.

The succession of cuts supplies therefore by reason of the V-shaped arrangement of the cutters a succession of triangular dough elements the apices of which are located alternately to either side of the machine.

Rolling of the dough (FIGS. 7 to 12):

The shaft 28 (FIGS. 7, 8, 9 and 11) carries a crank 70 which, through the connecting rod 71, imparts an oscillatory movement to the lever 72 pivotally secured at 73 to the main frame. Said lever 72 controls through a connecting rod 74 the apex 75 of a bent arm 76, 76' (FIG. 9) pivotally secured at 77 to the frame and carrying at its free end a suction cup V. It is apparent that upon shifting of the apex 76 of the bent arm by the connecting rod 74, said free end of the arm 76, 76' describes an arcuate line around the pivot 77 whenever the connecting rod 71 draws the member 72 in the direction of the arrow as illustrated in FIG. 9 whereby the suction cup V is shifted from the position illustrated in FIG. 9 into the position illustrated in FIG. 10. The suction cup is thus simultaneously shifted to one side of the belt T and rotated through 90° so as to lay on the lateral conveyor belt t or t' (FIG. 8) the triangular dough element removed off the main conveyor belt T. At an intermediate point between the stationary pivot 77 and its pivotal connection with the connecting rod 74, the section 76 of the bent arm carrying the suction cup V is pivotally secured at 79 through a bent link 78 to the bent arm 80 pivotally secured at 81 to the main frame and carrying at its free end the other suction cup V'. It is apparent that the precedingly described movement of the arm 76, 76' causes the arm 80 to rock around the pivot 81 in a manner such that the suction cup V' may execute an arcuate movement symmetrical of that executed by the other suction cup V and which leads it to the other side of the conveyor T.

In order that the suction cups V and V' may engage the corresponding triangular dough elements p, p' so as to bring them into the locations p1 and p'1 as illustrated in FIG. 11 and to leave them in position on the lateral belts, it is necessary to subject them in alternation and at the desired moments to the suction produced by the air pump 36 (FIG. 7) and thenafter to atmospheric pressure. For this purpose a cam 82 keyed to the shaft 28 controls an arm 83 adapted to pivot around a stationary point 84 and the free end 83a of which is pivotally secured to the rod of a slide valve or the like distributor 85 which provides a connection selectively between the hoses 86 and 86' terminating with the suction cups and the air pump 36 and cuts off said connection.

The lateral conveyor belts t and t' provided for the winding of the dough elements into rolls are controlled by the main shaft 28 coaxially rigid with a toothed wheel 88 and by a chain 87 (FIG. 7) extending between said toothed wheel 88 and a further toothed wheel 89 keyed to the shaft 90 carrying the rollers 91 and 91' driving said lateral belts. The triangular dough elements p and p' are thus carried out of their positions illustrated in FIGS. 4 and 5 so as to be laid on the corresponding lateral belts and to be brought underneath the winding means illustrated cross-sectionally in FIG. 7 and in elevational view in FIG. 12. Said arrangement includes a plate of sponge rubber E hanging above each lateral belt t and t' (FIGS. 7 and 12) as provided by two longitudinal blades 92 bent so as to engage said plate at both ends, said blades being in their turn suspended across a crossmember 93 urged downwardly by a transverse spring blade 94. A knob-controlled screw 95 screwed into a further rigid crossmember 96 secured to the frame allows adjusting the spacing between the plate E and the lateral belts and thereby the pressure exerted by it on the dough element. The latter reaching through the base of the triangle formed by it the underside of the plate E is wound automatically and, by reason of the elastic securing of the plate E, the slope of the latter varies gradually as the wound dough element increases in diameter.

The rolls formed are collected at the output ends of the lateral belts and the only remaining step to be executed consists in incurving them into crescent shape.

According to a further embodiment, the dough winding belts may extend perpendicularly to the main belt which eliminates the necessity of shifting through 90° the triangular dough elements as provided by the suction cups while in contradistinction said modification has the drawback consisting in delivering the dough rolls at two receiving stations located to either side of the machine.

The suction table 34 is permanently connected with the air pump through a third pipe or hose which is not illustrated.

The machine described may be simplified by omitting the rolling mill since it is possible to prepare the dough sheet elsewhere and to bring it onto a primary conveyor belt t2 located at the input of the machine as illustrated in FIG. 13. Said primary belt progresses intermittently in the same manner as the main belt T and is controlled together with the latter by means of a toothed wheel 97 keyed to the shaft 24 and of the chain 98. The dough is thus urged by the belt 2 onto a bridging plate 99 made of sheet metal beyond which the dough sheet reaches the main belt T. Such a simplified machine does away with the folding of the dough sheet ascribable to the difference in progression between the continuously operating rolling mill and the intermittently operating cutting and winding means.

What we claim is:

1. A pastry making machine for producing crescent rolls comprising a main conveyor belt adapted to be fed intermittently a dough sheet, means urging said main belt intermittently in a forward direction, means for cutting the dough sheet into successive pairs of triangular elements the apices of which are located alternatingly along either edge of the belt, means for lowering said cutting means into engagement with the dough sheet during each stoppage of the main belt, means for winding each triangular dough element starting from its base towards its apex to form thereby a roll the thickness of which is larger in its middle than at its ends and means for conveying the dough elements from the location thereof on the main belt underneath the cutting means towards the winding means.

2. A machine as claimed in claim 1 including a rolling mill adapted to transform dough into a sheet of a predetermined thickness and breadth, means feeding said dough sheet onto the main conveyor and common means controlling the rolling mill and the intermittent belt urging means.

3. A machine as claimed in claim 1 comprising a motor adapted to revolve continuously, means through which said motor controls the intermittent progression of the main belt and including a cam crank controlled by the motor, a connecting rod controlled by said crank, a drum carrying the main belt, a ratchet wheel coaxially rigid with said drum and controlled intermittently by said connecting rod and a lever through which said rod acts on the cutting means to make said cutting means revolve round a stationary axis in synchronism with the stoppages of the belt during its intermittent progression.

4. A machine as claimed in claim 1 wherein the cutting means include two cutters in relative V-shaped formation adapted to be lowered across said belt into engagement with successive portions of the dough sheet and the winding means include two elementary winding systems adapted to engage the bases of the triangular dough elements extending along the corresponding edge of the belt.

5. A machine as claimed in claim 1 wherein the winding means include at least one endless auxiliary belt adapted to carry along the triangular dough elements and including a yielding friction plate, means for shifting the triangular dough elements with their bases forwardly into engagement with said friction plate to cause the latter to frictionally wind said elements round a line registering substantially with the base of the element.

6. A machine as claimed in claim 1 wherein the winding means include at least one endless auxiliary belt adapted to carry along the triangular dough elements and including a yielding friction plate, means for shifting the triangular dough elements with their bases forwardly into engagement with said friction plate to cause the latter to frictionally wind said elements round a line registering substantially with the base of the element, a transverse member carrying the friction plate, a spring blade urging elastically said crossmember and thereby the friction plate downwardly towards a location provided for the triangular dough elements and means for vertically adjusting the position of the spring blade.

7. A machine as claimed in claim 1 comprising a motor adapted to revolve continuously, means through which said motor controls the intermittent progression of the main belt and including a crank controlled by the motor, a connecting rod controlled by said crank, a drum carrying the main belt, a ratchet wheel coaxially rigid with said drum and controlled intermittently by said connecting rod, a cam rigid with said crank, a rod controlled by the cam and a lever through which said rod acts on the cutting means to shift said cutting means in synchronism with the stoppage of the belt during its intermittent progression and means through which the motor controls last-mentioned conveying means and which include a pivotally interconnected lever system carrying said suction means, a connecting rod and crank system controlling said lever system and controlled by the motor.

8. A machine as claimed in claim 1 comprising a motor adapted to revolve continuously, means through which said motor controls the intermittent progression of the main belt and including a crank controlled by the motor, a connecting rod controlled by said crank, a drum carrying the main belt, a ratchet wheel coaxially rigid with said drum and controlled intermittently by said connecting rod, a cam rigid with said crank, a rod controlled by the cam and a lever through which said rod acts on the cutting means to shift said cutting means in synchronism with the stoppages of the belt during its intermittent progression, the last-mentioned conveying means of said machine comprising two suction cups adapted to engage the triangular element, on the corresponding side of the sheet on the conveyor belt, an arm carrying each suction cup, a common connecting rod controlled by the motor and controlling the suction cup carrying arms to shift said arms with the elements carried by said arms simultaneously in opposite directions transversely of the conveyor belt and off the latter, and lateral belts progressing to either side of the conveyor belt towards the winding means and on which the suction cups drop the elements engaged by the suction cups to be fed by said lateral belts towards the winding means.

9. A machine as claimed in claim 1 comprising a motor adapted to revolve continuously, means through which said motor controls the intermittent progression of the main belt and including a crank controlled by the motor, a connecting rod controlled by said crank, a drum carrying the main belt, a ratchet wheel coaxially rigid with said drum and controlled intermittently by said connecting rod, a cam rigid with said crank, a rod controlled by the cam and a lever through which said rod acts on the cutting means to shift said cutting means in synchronism with the stoppage of the belt during its intermittent progression, the last-mentioned conveying means of said machine comprising two suction cups adapted to engage the triangular suction cup, on the corresponding side of the sheet on the conveyor belt, an arm carrying each suction cup, a common connecting rod controlled by the motor and controlling the suction cup carrying arms to shift said arms with the elements carried by said arms simultaneously in opposite directions transversely of the conveyor belt and off the latter and lateral belts progressing to either side of the conveyor belt towards the winding means and on which the suction cups drop the elements engaged by the suction cups to be fed by said lateral belts towards the winding means, a vacuum pump, a distributor connecting the vacuum pump with the suction cups, an oscillating lever controlling the distributor, and common means controlling said oscillating lever and the intermittent progression of the conveyor belt.

10. A machine as claimed in claim 1 including a rolling mill adapted to transform dough into a sheet of a predetermined thickness and breadth, means feeding said dough sheet onto the main conveyor belt and common means controlling the rolling mill and the intermittent belt urging means, a perforated hollow table over which the conveyor belt is adapted to run, a vacuum pump and means connecting the latter with the hollow table to make the dough sheet engage adhesively said main belt.